(12) United States Patent
Shimada et al.

(10) Patent No.: US 7,286,758 B2
(45) Date of Patent: Oct. 23, 2007

(54) METHOD FOR SWITCHING TRANSMISSION ROUTE, AND OPTICAL TRANSMISSION DEVICE

(75) Inventors: Yuji Shimada, Kawasaki (JP); Hiroaki Tomofuji, Kawasaki (JP); Takuji Maeda, Kawasaki (JP); Takeshi Sakamoto, Kawasaki (JP); Ichiro Nakajima, Kawasaki (JP)

(73) Assignee: Fujitsu limited, Kawasaki (JP)

( * ) Notice: Subject to any disclaimer, the term of this patent is extended or adjusted under 35 U.S.C. 154(b) by 0 days.

(21) Appl. No.: 11/332,860

(22) Filed: Jan. 13, 2006

(65) Prior Publication Data

US 2006/0188253 A1    Aug. 24, 2006

Related U.S. Application Data

(63) Continuation of application No. PCT/JP03/09218, filed on Jul. 18, 2003.

(51) Int. Cl.
  *H04B 10/08* (2006.01)
  *H04B 10/02* (2006.01)
(52) U.S. Cl. .................. 398/33; 398/177; 398/15; 398/17
(58) Field of Classification Search ............. 398/1, 398/4–6, 15, 17, 18, 33, 177, 173, 175, 176, 398/181
  See application file for complete search history.

(56) References Cited

U.S. PATENT DOCUMENTS

| 6,407,834 | B1 | 6/2002 | Takeshita et al. | |
| 6,657,952 | B1 * | 12/2003 | Shimomura et al. | 370/223 |
| 6,933,852 | B2 * | 8/2005 | Kitajima et al. | 340/635 |
| 2001/0046074 | A1 | 11/2001 | Kakizaki et al. | |
| 2003/0223745 | A1 * | 12/2003 | Tomofuji et al. | 398/9 |
| 2004/0005152 | A1 * | 1/2004 | Horachi et al. | 398/79 |

FOREIGN PATENT DOCUMENTS

| EP | 0 907 266 | 4/1999 |
| JP | 5-037471 | 2/1993 |
| JP | 10-107742 | 4/1998 |
| JP | 11-098077 | 4/1999 |

(Continued)

OTHER PUBLICATIONS

International Search Report dated Aug. 26, 2003.

(Continued)

*Primary Examiner*—Dalzid Singh
(74) *Attorney, Agent, or Firm*—Katten Muchin Rosenman LLP

(57) ABSTRACT

A method for switching a transmission route in an optical network. A regenerator station extracts a main signal, and detects the input level of the main signal. When the input level falls below a threshold, the regenerator station determines that a failure occurs, and stops output of a main signal from the regenerator station, and transmits a control signal indicating occurrence of the failure to a receiver station, which separates the control signal from a main signal transmitted thereto, detects the input level of the main signal at the receiver station, analyzes the separated control signal, and determines whether or not a failure occurs. When the input level of the main signal at the receiver station falls below a threshold, or when the separated control signal indicates occurrence of a failure, the receiver station detects the occurrence of the failure, and switches the transmission route.

8 Claims, 11 Drawing Sheets

FOREIGN PATENT DOCUMENTS

| | | |
|---|---|---|
| JP | 11-331043 | 11/1999 |
| JP | 2002-051009 | 2/2002 |
| JP | 2003-069455 | 3/2003 |
| JP | 2003-338794 | 11/2003 |
| JP | 2004-007064 | 1/2004 |
| JP | 2004-023437 | 1/2004 |

OTHER PUBLICATIONS

Japanese Office Action dated Jul. 11, 2006.
Japanese Office Action dated Jan. 23, 2007.

* cited by examiner

METHOD FOR SWITCHING TRANSMISSION ROUTE, AND OPTICAL TRANSMISSION DEVICE

CROSS-REFERENCE TO RELATED APPLICATIONS

This application is a continuing application, filed under 35 U.S.C. Section 111(a), of International Application PCT/JP2003/009218, filed Jul. 18, 2003.

BACKGROUND OF THE INVENTION

1) Field of the Invention

The present invention relates to a method for switching a transmission route in an optical network in which nodes are connected through a plurality of transmission lines realizing a working route and a protection route, when a failure or the like is detected. The present invention also relates to an optical transmission device in which a transmission route is switched by using the above method.

2) Description of the Related Art

With the recent increase in the capacities of the networks, use of the WDM (Wavelength Division Multiplex) technology has been spreading to construction of metro area networks as well as the networks in backbone systems. In the current optical networks, the transmission distance and the capacity are increased by use of optical amplifiers. However, since optical amplification by use of an optical amplifier is repeated, the noise levels in optical signals become higher. Therefore, in order to further increase the transmission distance, transmission devices having a function of regenerative repeating are used.

The transmission devices having a function of regenerative repeating are repeaters which convert optical signals into electric signals, and thereafter convert electric signals into optical signals. The main factors of limiting the increase in the transmission distance are accumulation of noise (represented by the SNR) caused by use of the optical amplifiers, dispersion in optical devices, and deformation of optical signals caused by nonlinear effects. The SNR is the ratio of the signal component to the noise component. Therefore, there is a limit to transmission of optical signals by use of only optical amplifiers without conversion into electric signals. That is, it is necessary to convert the optical signals into electric signals, regenerate the original information from the electric signals, and produce noiseless optical signals for transmission. The transmission devices which regenerate and transmit optical signals as above are called regenerator stations.

In addition, in the optical networks, a plurality of transmission routes are arranged between nodes so that even when one of the plurality of transmission routes fails, optical transmission can be performed through another transmission route. For example, in the optical ring networks, nodes are circularly arranged, and transmission lines connecting each pair of adjacent nodes are doubled. In the case where counterclockwise transmission routes for optical signals at arbitrary wavelengths are used as working routes, clockwise transmission routes are used as protection routes.

Further, in the optical networks, the function of an optical ADM (add-drop multiplexer), which can add (insert), drop (extract), and let through (relay) optical signals at each wavelength, is used. When the function of the optical ADM is used in an optical network, it is possible to construct flexible networks by performing control operations, such as the add (insert), drop (extract), and through (relay) operations, on optical signals at each wavelength at each station arranged on the optical network. When a node having the function of the optical ADM is a receiver station, and detects occurrence of a failure at each wavelength or in each transmission line as a working route, the node acquires optical signals through a protection route. Such a function of switching the transmission route is called the optical protection function.

In optical protection, a fixed threshold of the optical level is used as a switch trigger. When the optical level falls below the threshold, the receiver station having the optical protection function determines that a line failure occurs, and switches the setting in the optical layer from the working route to a protection route. In this case, generally, recovery in 50 ms (milliseconds) is required. An example of an optical network having the above optical protection function is the OUPSR (Optical Unidirectional Path-Switched Ring), in which each transmitter station transmits main signals through both of a working route and a protection route. When a failure occurs in the working route, a receiver station determines loss of light on the basis of LOL (loss of light) detection by a photodetector (photodiode) provided in the receiver station. When the loss of light is determined, the route for use in transmission is switched to the protection route by using an optical switch or the like.

Incidentally, even in the optical networks in which a working system and a protection system are provided in each span between nodes, an instantaneous interruption of an optical signal occurs when the switching between the working system and the protection system is done. Therefore, reduction of the interruption time by improvement of the rising time of the optical amplifier has been proposed, for example, disclosed in Japanese Unexamined Patent Publication No. 2003-69455, paragraphs Nos. 0027 to 0028 and FIG. 3.

However, in the optical networks in which optical amplifiers are connected in multiple stages, optical noise accumulates. In addition, when an optical signal interrupts, the optical noise which is produced and accumulated by the optical amplifiers remains, and the input power at repeaters and a receiver station increases. In such cases, if only a fixed threshold of the optical level is used as the switch trigger for optical protection, it is possible to expect that loss of optical input (RIN) in a receiver station or the level alarm (LOL) of optical input into an optical detector cannot be detected. That is, it is difficult for the receiver station to detect a failure with reliability.

SUMMARY OF THE INVENTION

The present invention is made in view of the above problems, and the first object of the present invention is to provide a method for switching a transmission route in an optical network so as to realize quick and reliable optical protection. In addition, the second object of the present invention is to provide an optical transmission device in which a transmission route is switched by using the above method.

In order to accomplish the first object, a method for switching a transmission route for use in transmission from a transmission station to a receiver station in an optical network in which the transmission station and the receiver station are connected through a plurality of transmission routes with redundancy is provided. The method comprises the steps of: (a) converting a main signal transmitted from the transmission station to a regenerator station arranged on a first one of the plurality of transmission routes, into an electric signal, and detecting an input level of the main signal, in the regenerator station; (b) converting the electric signal into an optical signal, inserting the optical signal, as the main signal, into the first one of the plurality of transmission routes from the regenerator station when the input level is equal to or higher than a predetermined level, and stopping output of the optical signal from the regenerator station when the input level is lower than the predetermined level; (c) transmitting a control signal indicating occurrence of a failure, from the regenerator station through a transmission route to the receiver station, when the input level is lower than the predetermined level; and (d) switching a transmission route from which the receiver station acquires the main signal, from the first one of the plurality of transmission routes to a second one of the plurality of transmission routes, when an input level of the main signal at the receiver station is lower than a predetermined level or when the receiver station receives the control signal.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

A preferred embodiment of the present invention will be explained below with reference to the accompanying drawings.

Principle of the Invention

First, an outline of the present invention which is realized in the embodiment is indicated, and thereafter details of the embodiment are explained.

Figure 1:
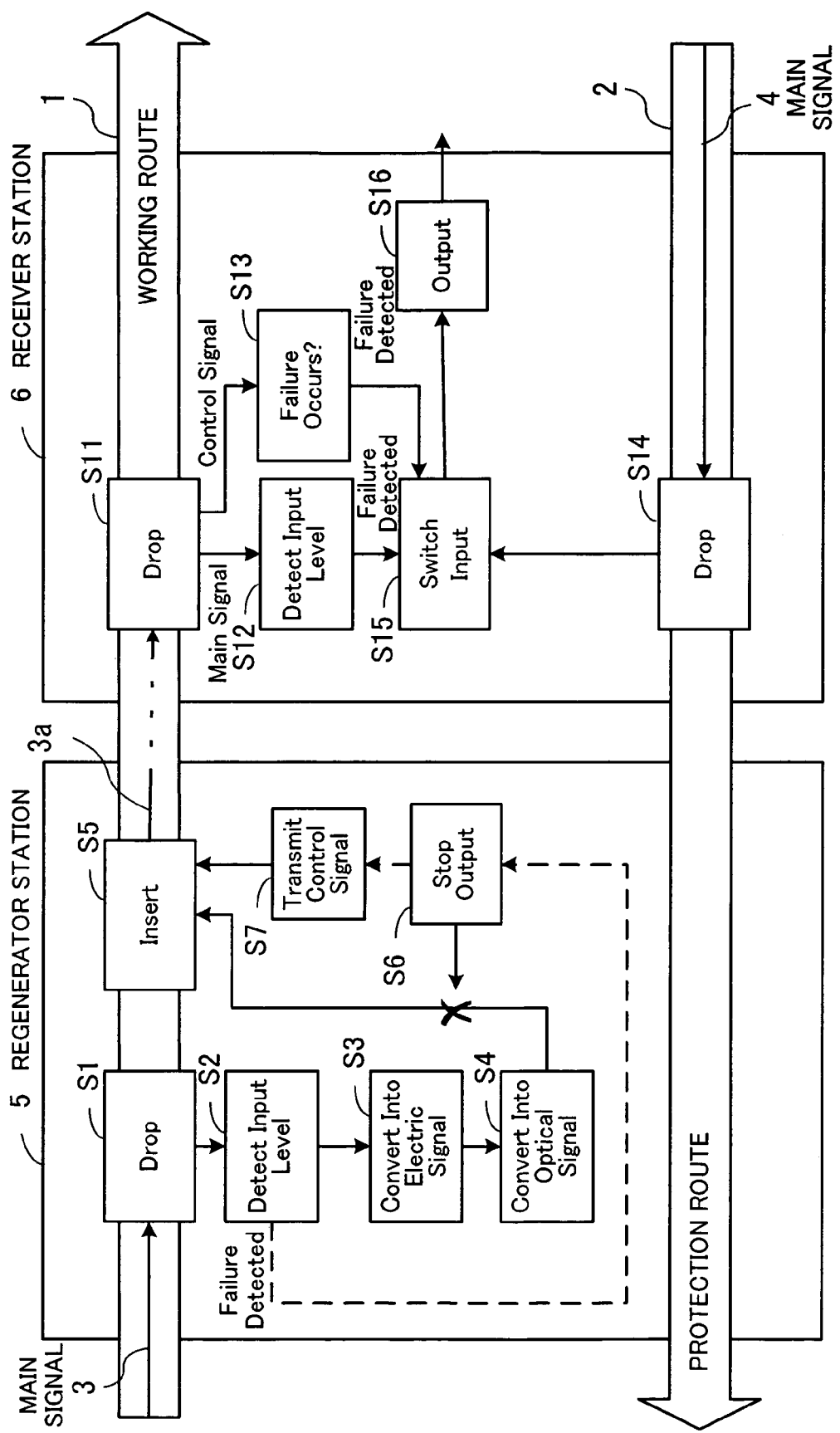
FIG. 1 is a diagram illustrating the principle of the present invention.

FIG. 1 is a diagram illustrating the principle of the method for switching a transmission route according to the present invention. In the optical network to which the present invention is applied includes a plurality of transmission lines having redundancy. In FIG. 1, a working route 1 and a protection route 2 are indicated. The working route 1 is used in normal optical communications, and the protection route 2 is used when a failure occurs. A transmission station (not shown) outputs main signals 3 and 4 representing identical information onto both of the working route 1 and the protection route 2.

A regenerator station 5 is arranged in the working route 1 between the transmission station and a receiver station 6. The regenerator station 5 extracts the main signal 3 (which is at a predetermined wavelength) in step S1, and then detects the input level of the extracted main signal 3 in step S2. In addition, the regenerator station 5 converts the extracted main signal 3 into an electric signal in step S3. When the input level of the main signal 3 is equal to or higher than a predetermined level, the regenerator station 5 converts the electric signal into an optical signal in step S4, and inserts the optical signal as a main signal 3a into the working route 1 in step S5.

When the input level of the main signal 3 is lower than the predetermined level, the regenerator station 5 determines that a failure is detected, stops outputting the main signal 3a in step S6, and transmits a control signal indicating the occurrence of the failure, to the receiver station 6 through an arbitrary transmission route (e.g., the working route 1) in step S7. In the case where the control signal is transmitted through the working route 1, the control signal is inserted into a main signal transmitted through the working route 1 to the regenerator station 5.

When the main signal 3a and the control signal are transmitted through the working route 1 to the receiver station 6, the receiver station 6 separates the control signal from the main signal 3a in step S11, detects the input level of the main signal 3a in step S12, analyzes the control signal, and determines occurrence or absence of a failure on the basis of the analysis of the control signal in step S13.

In addition, the receiver station 6 extracts the main signal 4 transmitted through the protection route 2 in step S14. When the input level of the main signal 3a is lower than the predetermined level, or when the receiver station 6 receives the control signal indicating occurrence of a failure, the receiver station 6 switches the transmission route from which the receiver station 6 receives the main signal, from the working route 1 to the protection route 2 in step S15. When the transmission route is not switched, the receiver station 6 outputs the main signal 3a transmitted to the receiver station 6 through the working route 1. When the transmission route is switched, the receiver station 6 outputs the main signal 4 transmitted to the receiver station 6 through the protection route 2 in step S16.

In the above method for switching a transmission route according to the present invention, the regenerator station 5 detects the input level of the main signal 3 transmitted through the first transmission route. When the input level of the main signal falls below the predetermined level, the regenerator station 5 stops outputting the optical signal which is generated by conversion from the electric signal, and transmits a control signal indicating occurrence of a failure, to the receiver station 6 through an arbitrary route. When the input level of the main signal transmitted through the first transmission route to the receiver station 6 falls below the predetermined level, or when the receiver station 6 receives the control signal indicating occurrence of a failure, the receiver station 6 switches the transmission route from which the receiver station 6 receives the main signal, from the first transmission route to the second transmission route.

That is, when the input level of the main signal 3 which enters the regenerator station 5 is lower than the predetermined level, the regenerator station 5 stops outputting the main signal 3a, and transmits to the receiver station 6 a control signal indicating occurrence of a failure. Therefore, even when noise and the like raise the input level of the main signal 3a at the receiver station 6 to or above the predetermined level, the receiver station 6 can detect occurrence of a failure on the basis of the control signal, and switch the transmission route. Thus, it is possible to quickly and reliably switch the transmission route when a failure occurs.

In the preferred embodiment of the present invention which are explained below, the present invention is applied to a ring network having a WDM optical add/drop function. In the following explanations, a first node which outputs a main signal onto a transmission route connecting the first node and a second node is referred to as an upstream node, and the second node, which receives the main signal, is referred to as a downstream node.

Configuration of Network

Figure 2:
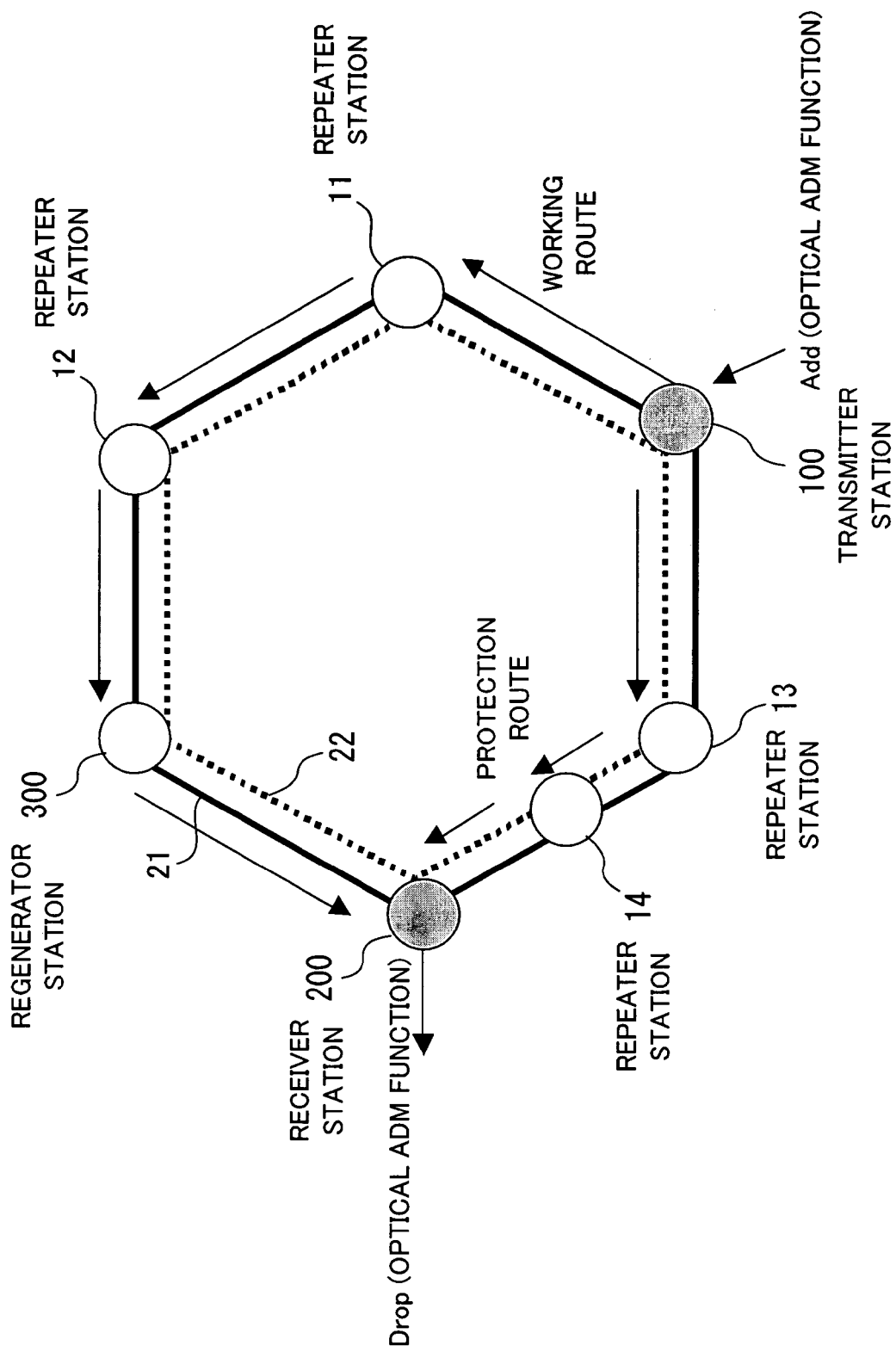
FIG. 2 is a diagram schematically illustrating an example of a configuration of a ring network having a WDM optical add/drop function.

FIG. 2 is a diagram schematically illustrating an example of a configuration of a ring network having a WDM optical add/drop function. In the network of FIG. 2, a plurality of nodes are arranged in a ring, and connected through two circular transmission routes, the counterclockwise transmission route for optical signals is used as a working route 21 (i.e., a route which is to be normally used), and the clockwise transmission route is used as a protection route 22 (i.e., a route which is to be used when a failure occurs in the working route 21). It is predetermined which of the clockwise and counterclockwise transmission routes is to be used as the working route 21 or the protection route 22 for each of a plurality of wavelengths of a main signal.

In the example of FIG. 2, an optical signal at a predetermined wavelength is inserted from the transmission station 100, and is then dropped from the receiver station 200. Repeater stations 11 to 14 and a regenerator station 300 are arranged on the transmission routes. The repeater stations 11 to 14 amplify optical signals propagating through the transmission routes. In addition, the regenerator station 300 regenerates the optical signals propagating through the transmission routes, by converting the optical signals into electric signals, regenerating the electric signals, and converting the electric signals into regenerated optical signals, so that noise included in the optical signals propagating through the transmission routes are removed, and clear optical signals are reproduced.

Each of the transmission station 100 and the receiver station 200 has an optical ADM function. According to the optical ADM function, control operations, such as the add (insert), drop (extract), and through (relay) operations, can be performed on optical signals at each wavelength. Thus, it is possible to construct a flexible network.

In the network having the above configuration, the transmission station 100 transmits identical optical signals at a predetermined wavelength, through two transmission routes. The optical signals respectively propagate through the working route 21 and the protection route 22 to the receiver station 200. Specifically, the optical signal propagating through the working route 21 to the receiver station 200 passes through the repeater stations 11 and 12 and the regenerator station 300, and the optical signal propagating through the protection route 22 to the receiver station 200 passes through the repeater stations 13 and 14.

The receiver station 200 drops one of the optical signals at the predetermined wavelength transmitted through the two transmission routes to the receiver station 200. When no failure occurs in the transmission routes, the receiver station 200 outputs (drops) the optical signal transmitted through the working route 21. When a failure occurs in the working route 21, and for example, when the input level of an optical signal transmitted through the working route 21 to the receiver station 200 is extremely low, the receiver station 200 outputs (drops) the optical signal transmitted through the protection route 22.

In the above optical network, the optical supervisory channel (OSC) is used for control and maintenance. The OSC signals transmitted through the OSC are control signals used for controlling and monitoring the states between stations, devices in the entire optical network, optical signals for use, and information for setting lines and the like. In the WDM network, the OSC signals are transmitted at a wavelength different from the plurality of wavelengths of the main signal. When the OSC is used, terminals for remote monitoring and control can access each station.

Internal Construction of Transmission Station

Figure 3:
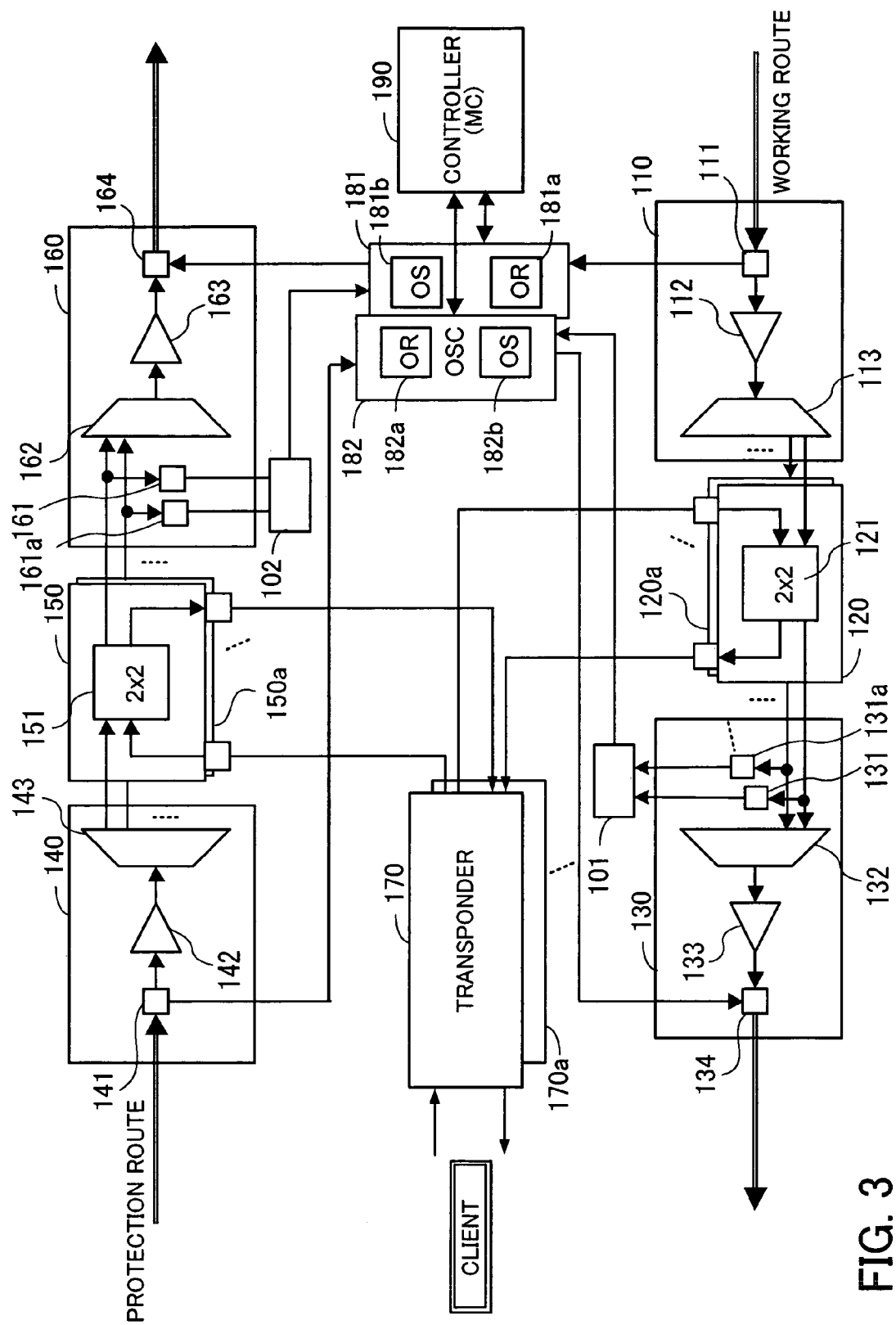
FIG. 3 is a diagram illustrating an example of an internal construction of a node having an optical ADM function.

FIG. 3 is a diagram illustrating the internal construction of the transmission station 100 indicated in FIG. 2 as an example of an internal construction of a node having an optical ADM function. The transmission station 100 comprises: output-monitor circuits 101 and 102; a preamplifier unit 110, switch units 120, 120a, . . . (respectively provided for the plurality of wavelengths), and a postamplifier unit 130, which are provided in the working route 21; and a preamplifier unit 140, switch units 150, 150a, . . . (respectively provided for the plurality of wavelengths), and a postamplifier unit 160, which are provided in the protection route 22. Further, the transmission station 100 comprises transponders 170, 170a, . . . (respectively provided for the plurality of wavelengths), OSC (optical supervisory channel) units 181 and 182, and a controller (MC) 190.

First, the construction for optical amplification in the working route 21 is explained below.

Each WDM signal transmitted from the adjacent node in the working route 21 (i.e., the repeater station 13 in the example of FIG. 2) enters the preamplifier unit 110. The preamplifier unit 110 comprises an OSC-signal separator 111, a preamplifier 112, and a main-signal separator 113. The OSC-signal separator 111 separates the OSC signals from the WDM signal. The separated OSC signals are supplied to the OSC unit 181. The main signal for communication remaining in the WDM signal passes through the OSC-signal separator 111, and enters the preamplifier 112. The preamplifier 112 amplifies the main signal, and sends the amplified main signal to the main-signal separator 113. The main-signal separator 113 separates the main signal (which is wavelength-multiplexed) into optical signals at the plurality of wavelengths. The separated optical signals enter the switch units 120, 120a, for the corresponding wavelengths, respectively.

The switch unit 120 includes a 2×2 optical switch 121, which receives an optical signal at a predetermined wavelength separated by the main-signal separator 113, and an optical signal which is supplied from the transponder 170 and is to be inserted into (added to) the optical network. Each of the optical signals which enters the 2×2 optical switch 121 is lead to one of the postamplifier unit 130 and the transponder 170. The 2×2 optical switch 121 selects the destination of each optical signal inputted thereto, according to a control signal supplied from the controller 190, and outputs the optical signal to the selected destination. For example, when the optical signal at the wavelength corresponding to the switch unit 120 is to be dropped, the 2×2 optical switch 121 is set in the cross state (in which the paths of the optical signals inputted into the 2×2 optical switch 121 intersect with each other before being outputted from the 2×2 optical switch 121 in the illustrated example). In this state the optical signal sent from the preamplifier unit 110 is outputted from the 2×2 optical switch 121 to the transponder 170. In addition, when an optical signal from the transponder 170 enters the switch unit 120 in the above state, the 2×2 optical switch 121 outputs the optical signal to the postamplifier unit 130. The other switch units 120a, . . . have a similar construction to the switch unit 120.

The postamplifier unit 130 comprises photodetectors (photodiodes) 131, 131a, . . . (respectively provided for the plurality of wavelengths), a main-signal combiner 132, a postamplifier 133, and an OSC-signal combiner 134. When optical signals outputted from the switch units 120, 120a, . . . enter the postamplifier unit 130, the respective optical signals are split by splitters or the like, the input levels of the optical signals are detected by the photodetectors 131, 131a, . . . , and portions of the optical signals enter the main-signal combiner 132. The photodetectors 131, 131a, . . . supply to the output-monitor circuit 101 information indicating the input levels of the optical signals which enter the postamplifier unit 130. The output-monitor circuit 101 monitors the input levels of the optical signals at the plurality of wavelengths which are detected by the photodetectors 131, 131a, . . . . When the input level of one of the optical signals falls below a predetermined level, the output-monitor circuit 101 sends to the OSC unit 182 WCF (wavelength channel failure) information which indicates the channel number of the optical signal. That is, the WCF information indicates that a failure occurs in transmission of the optical signal having the channel number.

The main-signal combiner 132 multiplexes the optical signals (which constitute a main signal) inputted thereto, and outputs the multiplexed optical signals to the postamplifier 133. The postamplifier 133 amplifies the multiplexed optical signals, and outputs the amplified, multiplexed optical signals (as a main signal) to the OSC-signal combiner 134. The OSC-signal combiner 134 receives OSC signals from the OSC unit 182, as well as the main signal from the postamplifier 133, inserts the OSC signals into the main signal, and outputs the optical signal in which the OSC signals are inserted into the main signal, to the downstream node (the repeater station 11 in the example of FIG. 2).

Next, the construction for optical amplification in the protection route 22 is explained below.

Each WDM signal transmitted from the adjacent node in the protection route 22 (i.e., the repeater station. 11 in the example of FIG. 2) enters the preamplifier unit 140. The preamplifier unit 140 comprises an OSC-signal separator 141, a preamplifier 142, and a main-signal separator 143. The OSC-signal separator 141 separates the OSC signals from the WDM signal. The separated OSC signals are supplied to the OSC unit 182. The main signal for communication remaining in the WDM signal passes through the OSC-signal separator 141, and enters the preamplifier 142. The preamplifier 142 amplifies the main signal, and sends the amplified main signal to the main-signal separator 143. The main-signal separator 143 separates the main signal (which is wavelength-multiplexed) into optical signals at the plurality of wavelengths. The separated optical signals enter the switch units 150, 150a, . . . for the corresponding wavelengths, respectively.

The switch unit 150 includes a 2×2 optical switch 151, which receives an optical signal at a predetermined wavelength separated by the main-signal separator 143, and an optical signal which is supplied from the transponder 170 and is to be inserted into (added to) the WDM signal transmitted through the optical network. Each of the optical signals which enters the 2×2 optical switch 151 is outputted to one of the postamplifier unit 160 and the transponder 170. The 2×2 optical switch 151 selects the destination of each optical signal inputted thereto, according to a control signal supplied from the controller 190, and outputs the optical signal to the selected destination. For example, when the optical signal at the wavelength corresponding to the switch unit 150 is to be dropped, the 2×2 optical switch 151 is set in the cross state. In this state, the optical signal sent from the preamplifier unit 140 is outputted from the 2×2 optical switch 151 to the transponder 170. In addition, when an optical signal from the transponder 170 enters the switch unit 150 in the above state, the 2×2 optical switch 151 outputs the optical signal to the postamplifier unit 160. The other switch units 150a, . . . have a similar construction to the switch unit 150.

The postamplifier unit 160 comprises photodetectors (photodiodes) 161, 161a, . . . (respectively provided for the plurality of wavelengths), a main-signal combiner 162, a postamplifier 163, and an OSC-signal combiner 164. When optical signals outputted from the switch units 150, 150a, . . . enter the postamplifier unit 160, the respective optical signals are split by splitters or the like, the input levels of the optical signals are detected by the photodetectors 161, 161a, . . . , and portions of the optical signals enter the main-signal combiner 162. The photodetectors 161, 161a, . . . supply to the output-monitor circuit 102 information indicating the input levels of the optical signals which enter the postamplifier unit 160. The output-monitor circuit 102 monitors the input levels of the optical signals at the plurality of wavelengths detected by the photodetectors 161, 161a, . . . . When the input level of one of the optical signals falls below a predetermined level, the output-monitor circuit 102 sends to the OSC unit 181 WCF (wavelength channel failure) information which indicates the channel number of the optical signal.

The main-signal combiner 162 multiplexes the optical signals (which constitute a main signal) inputted thereto, and outputs the multiplexed optical signals to the postamplifier 163. The postamplifier 163 amplifies the multiplexed optical signals, and outputs the amplified, multiplexed optical signals (as the main signal) to the OSC-signal combiner 164. The OSC-signal combiner 164 receives OSC signals from the OSC unit 181, as well as the main signal from the postamplifier 163, inserts the OSC signals into the main signal, and outputs the optical signal in which the OSC signals are inserted into the main signal, to the downstream node in the protection route 22 (the repeater station 13 in the example of FIG. 2).

The transponders 170, 170a, . . . are respectively provided for the plurality of wavelengths, and transmit and receive optical signals to and from client nodes. For example, when the transponder 170 receives an optical signal from a client network, the transponder 170 converts the optical signal into an electric signal, monitors the optical signal (when necessary), converts the electric signal into an optical signal, and outputs the optical signal converted from the electric signal, to the switch unit 120 for the working route 21 or the switch unit 150 for the protection route 22. In addition, the transponder 170 selects one of optical signals sent from at least one of the switch unit 120 for the working route 21 and the switch unit 150 for the protection route 22, and transmits the selected optical signal to another network or the like. Details of the internal construction of the transponder 170 are explained later.

The OSC units 181 and 182 transmit and receive control information to and from the adjacent nodes by using OSC signals at a wavelength different from the plurality of wavelengths of the main signal. The control information is information indicating the states between stations, the states of devices in the entire optical network, information for setting lines or optical signals for use, and other information.

The OSC unit 181 exchanges control information with another OSC unit which is arranged opposite to the OSC unit 181 in one of the adjacent nodes (the repeater station 13 in the example of FIG. 2). Specifically, the OSC unit 181 comprises an optical receiver (OR) 181a and an optical transmitter (OS) 181b. The optical receiver (OR) 181a receives OSC signals transmitted from the repeater station 13 through the OSC-signal separator 111, and the optical transmitter (OS) 181b transmits OSC signals to the repeater station 13 through the OSC-signal combiner 164. In addition, when the OSC unit 181 receives from the output-monitor circuit 102 WCF information on the channel in which lowering of the output power or the like occurs, the OSC unit 181 sends to the OSC-signal combiner 164 an OSC signal including the WCF information.

Similarly, the OSC unit 182 exchanges control information with another OSC unit which is arranged opposite to the OSC unit 182 in the adjacent node on the downstream side in the working route 21 (the repeater station 11 in the example of FIG. 2). Specifically, the OSC unit 182 comprises an optical receiver (OR) 182a and an optical transmitter (OS) 182b. The optical receiver (OR) 182a receives OSC signals transmitted from the repeater station 11 through the OSC-signal separator 141, and the optical transmitter (OS) 182b transmits OSC signals to the repeater station 11 through the OSC-signal combiner 134. In addition, when the OSC unit 182 receives from the output-monitor circuit 101 WCF information on the channel in which lowering of the output power or the like occurs, the OSC unit 182 sends to the OSC-signal combiner 134 an OSC signal including the WCF information.

The controller (MC) 190 controls the entire transmission station 100, and can be realized, for example, by making a computer containing a processor, a memory, and the like execute a program for controlling and monitoring the transmission station 100. Although not shown in FIG. 3, the controller 190 is electrically connected to the other elements indicated in FIG. 3 through connection lines so that the controller 190 can control the operation of each element. For example, when the controller 190 receives from the OSC units 181 and 182 a notification of lowering of the output power of an optical signal or the like in a channel, the controller 190 controls the transponders 170, 170a, . . . , and the transmission route is switched. When lowering of the output power of an optical signal transmitted through the working route 21 is detected, the controller 190 instructs a transponder corresponding to the wavelength of the optical signal to switch the transmission route to the protection route 22. Then, the transponder switches the transmission route.

In addition, when one of the OSC units 181 and 182 receives WCF information from one of the adjacent nodes, the controller 190 controls the OSC units 181 and 182, and transmits the WCF information to the other of the adjacent nodes (located opposite to the one of the adjacent nodes). Further, in each of the repeater stations 11 to 14, the WCF information is transmitted in a similar manner. Therefore, when the regenerator station 300 detects loss of optical input (RIN) or a level alarm (LOL) of an optical input, and WCF information is transmitted in the form of an OSC signal from the regenerator station 300 to the receiver station 200 by relaying the OSC signal through the nodes between the regenerator station 300 and the receiver station 200 in order.

Internal Construction of Transponder

Figure 4:
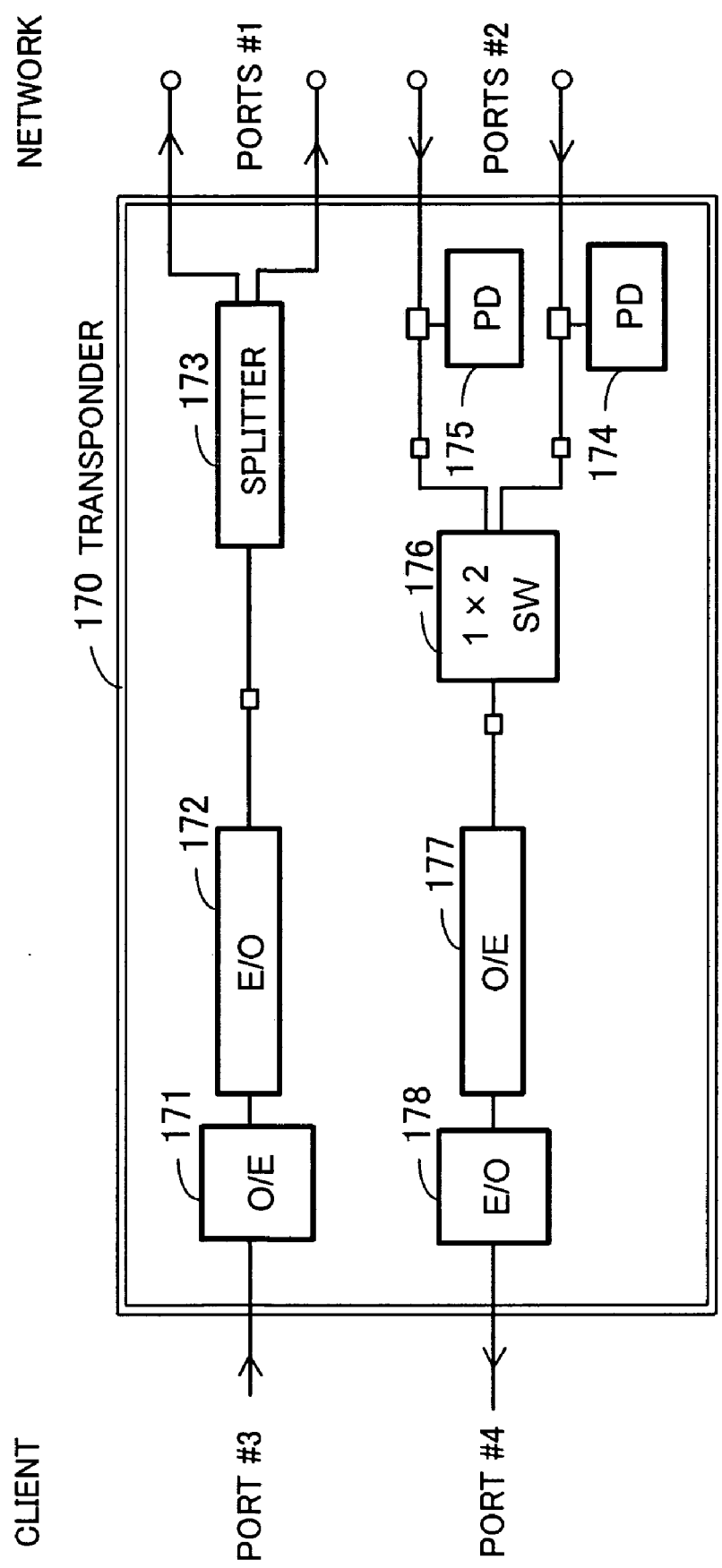
FIG. 4 is a diagram illustrating an example of an internal construction of a transponder.

FIG. 4 is a diagram illustrating an example of an internal construction of the transponder 170. The transponder 170 comprises an opto-electric converter (O/E) 171, an electro-optic converter (E/O) 172, a splitter 173, photodetectors (PD) 174 and 175, a 1×2 optical switch 176, an opto-electric converter (O/E) 177, and an electro-optic converter (E/O) 178. Each optical signal inputted from a client or the like first enters the opto-electric converter 171 through the port #3, the opto-electric converter 171 converts the optical signal into an electric signal, and sends the electric signal to the electro-optic converter 172. The electro-optic converter 172 converts the electric signal into an optical signal having a predetermined wavelength which is to be superimposed on a WDM signal on the optical network, and sends the optical signal to the splitter 173. The splitter 173 outputs the optical signal from the electro-optic converter 172, through the ports #1 to both of the switch unit 120 for the working route 21 and the switch unit 150 for the protection route 22.

Optical signals from both of the switch unit 120 for the working route 21 and the switch unit 150 for the protection route 22 enter the transponder 170 through the ports #2. For example, when both of the working route 21 and the protection route 22 are normal optical signals enter the transponder 170 from both the switch units 120 and 150. When a failure or the like occurs in the working route 21, optical signals enter the transponder 170 from only the switch unit 150 for the protection route 22.

The optical signals which enter the transponder 170 through the ports #2 are lead to the 1×2 optical switch 176. In addition, each of the above optical signals which is outputted from the switch unit 120 for the working route 21 is split by a splitter or the like so that a portion of the optical signal outputted from the switch unit 120 enters the photodetector 174. Similarly, each of the optical signals which is outputted from the switch unit 150 for the protection route 22 is split by a splitter or the like so that a portion of the optical signal outputted from the switch unit 150 enters the photodetector 175. The photodetectors 174 and 175 output to the controller 190 information indicating the input levels of the optical signals which enter the transponder 170 through the ports #2. Therefore, lowering and the like of the optical signal in each transmission route can be detected by the photodetector 174 or 175 so that the controller 190 can control switching of the transmission route according to the above information from the photodetectors 174 and 175.

The 1×2 optical switch 176 selects one of the optical signals inputted thereto, under control of the controller 190, and outputs the selected optical signal to the opto-electric converter 177. The opto-electric converter 177 converts the optical signal into an electric signal, and outputs the electric signal to the electro-optic converter 178. The electro-optic converter 178 converts the electric signal into an optical signal having a predetermined wavelength which is used in communication with an external client or the like, and outputs the optical signal converted from the electric signal, through the port #4.

Although the internal construction of the transmission station 100 is explained as an example of an internal construction of a node having an optical ADM function with reference to FIGS. 3 and 4, the receiver station 200 in FIG. 2 can also have a similar construction.

In the case where an optical signal conveying some information is inserted into the optical network through the transmission station 100 having the above construction, for example, the optical signal to be inserted first enters the transponder 170 through one of the port #3. Then, the optical signal is converted into an electric signal by the opto-electric converter 171, and the electric signal is converted by the electro-optic converter 172 into an optical signal having a predetermined wavelength. The optical signal outputted from the electro-optic converter 172 is split into first and second optical signals on optical paths, the first optical signal enters the switch unit 120, and the second optical signal enters the switch unit 150.

The first optical signal which enters the switch unit 120 for the working route 21 is lead to the main-signal combiner 132 by the 2×2 optical switch 121, and combined with other optical signals by the main-signal combiner 132. The main signal outputted from the main-signal combiner 132 is amplified by the postamplifier 133. Then, the main signal is transmitted to the downstream node in the working route 21 after OSC signals are inserted into the main signal by the OSC-signal combiner 134.

In addition, the second optical signal which enters the switch unit 150 for the protection route 22 is lead to the main-signal combiner 162 by the 2×2 optical switch 151, and combined with other optical signals by the main-signal combiner 162. The main signal outputted from the main-signal combiner 162 is amplified by the postamplifier 163. Then, the main signal is transmitted to the downstream node in the protection route 22 after OSC signals are inserted into the main signal by the OSC-signal combiner 164.

The transmission station 100 can also operate as a receiver station for optical signals. In this case, when an optical signal to be extracted (dropped) enters the preamplifier unit 110 for the working route 21, first, OSC signals are separated from the other portions (main signal) of the optical signal by the OSC-signal separator 111, and the separated OSC signals enter the OSC unit 181. The main signal from which the OSC signals are separated by the OSC-signal separator 111 is amplified by the preamplifier 112, and enters the main-signal separator 113. The main-signal separator 113 separates the main signal into optical signals at the plurality of wavelengths. The separated optical signals enter the switch units 120, 120a, . . . for the corresponding wavelengths, respectively. For example, when an optical signal which enters the switch unit 120 is to be dropped, the optical signal is lead to one of the ports #2 of the transponder 170 by the switch unit 120.

When the above optical signal outputted from the switch unit 120 enters the transponder 170, the photodetector 174 detects the input level of the optical signal, and informs the controller 190 of the detected input level. In addition, the above optical signal also enters the 1×2 optical switch 176. In the situation in which the working route 21 is selected as the transmission route, the above optical signal is lead to the opto-electric converter 177. Then, the optical signal is converted by the opto-electric converter 177 into an electric signal, and the electric signal is converted by the electro-optic converter 178 into an optical signal having a predetermined wavelength. Thereafter, the optical signal from the electro-optic converter 178 is outputted from the transponder 170 through the port #4.

When WCF information for an optical signal which passes through the regenerator station 300 and is to be dropped is outputted from the regenerator station 300, the WCF information is transmitted to the OSC unit 181 in the form of an OSC signal. Then, the OSC unit 181 analyzes the WCF information indicated by the OSC signal, detects occurrence of a failure, and informs the controller 190 of the occurrence of the failure. The controller 190 controls the transponder 170 corresponding to the wavelength of the optical signal in which the failure occurs so that the setting of the transmission route is switched from the working route 21 to the protection route 22 in the transponder 170.

In addition, when the input level of the optical signal to be dropped which is detected by the photodetector 131 falls below a threshold, the output-monitor circuit 101 detects loss of light (LOL), and informs the OSC unit 182 of the detection of the loss of light (LOL). Then, the OSC unit 182 informs the controller 190 of the occurrence of the failure, and the controller 190 controls the transponder 170 corresponding to the wavelength of the optical signal in which the failure occurs so that the setting of the transmission route is switched from the working route 21 to the protection route 22 in the transponder 170.

As explained above, when the construction illustrated in FIGS. 3 and 4 operates as a receiver station, the receiver station switches the setting of the transmission route in response to detection of loss of light (LOL) or acquisition of WCF information for an optical signal which is to be dropped. Therefore, even when noise accumulated by optical amplifiers arranged between the regenerator station and the receiver station makes detection of the loss of light (LOL) difficult, switching of the transmission route based on the WCF information. Thus, it is possible to quickly and reliably perform optical protection.

Details of Regenerator Station

Hereinbelow, details of the regenerator station 300 are explained.

Figure 5:
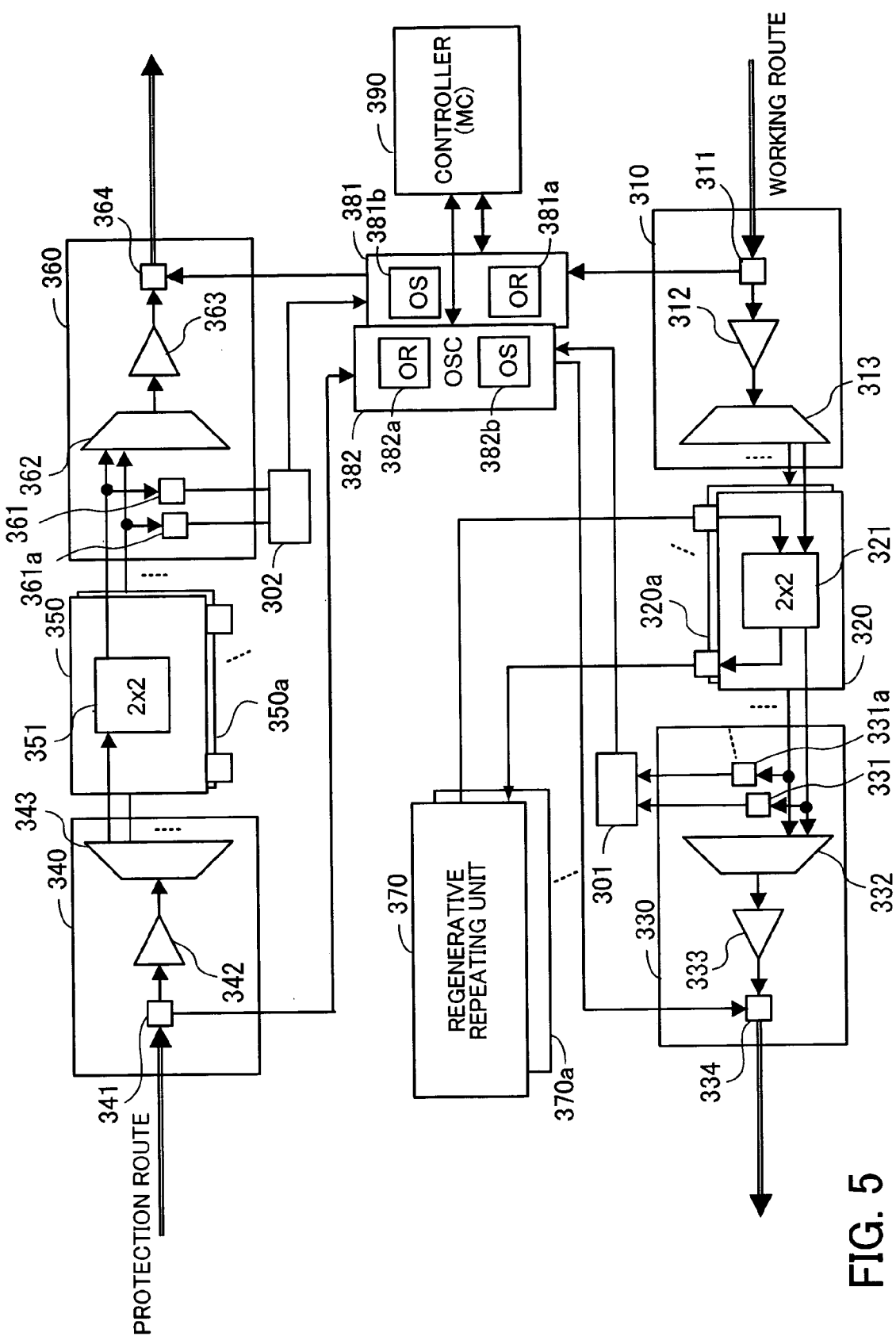
FIG. 5 is a diagram illustrating an example of an internal construction of a node having a regenerative repeating function.

FIG. 5 is a diagram illustrating the internal construction of the regenerator station 300 (in the network of FIG. 2) as an example of an internal construction of a node having a regenerative repeating function. The regenerator station 300 illustrated in FIG. 5 comprises: output-monitor circuits 301 and 302; a preamplifier unit 310, switch units 320, 320a, . . . (respectively provided for the plurality of wavelengths), and a postamplifier unit 330, which are provided in the working route 21; and a preamplifier unit 340, switch units 350, 350a, . . . (respectively provided for the plurality of wavelengths), and a postamplifier unit 360, which are provided in the protection route 22. Further, the regenerator station 300 comprises regenerative repeating units 370, 370a, . . . (respectively provided for the plurality of wavelengths), OSC (optical supervisory channel) units 381 and 382, and a controller (MC) 390.

First, the construction for optical amplification in the working route 21 is explained below.

Each WDM signal transmitted from the adjacent node in the working route 21 (i.e., the repeater station 12 in the example of FIG. 2) enters the preamplifier unit 310. The preamplifier unit 310 has functions and an internal construction which are similar to the preamplifier unit 110 illustrated in FIG. 3. That is, the preamplifier unit 310 comprises an OSC-signal separator 311, a preamplifier 312, and a main-signal separator 313. In the preamplifier unit 310, the WDM signal is amplified, and separated into optical signals at the plurality of wavelengths. Thereafter, the optical signals at the plurality of wavelengths are sent to the switch units 320, 320a, . . . , respectively. In addition, OSC signals contained in the WDM signal are separated from the other portions (constituting the main signal) of the WDM signal, and supplied to the OSC unit 381.

The switch unit 320 includes a 2×2 optical switch 321, which receives an optical signal at a predetermined wavelength separated by the main-signal separator 313, and an optical signal which is supplied from the regenerative repeating unit 370 and is to be inserted into (added to) the WDM signal transmitted through the optical network. Each of the optical signals which enters the 2×2 optical switch 321 is outputted to one of the postamplifier unit 330 and the regenerative repeating unit 370. The 2×2 optical switch 321 selects the destination of each optical signal inputted thereto, according to a control signal supplied from the controller 390, and outputs the optical signal to the selected destination. For example, when an optical signal separated by the main-signal separator 313 is to be regeneratively repeated, the 2×2 optical switch 321 is set in the cross state. In this state, the optical signal separated by the main-signal separator 313 is outputted from the 2×2 optical switch 321 to the regenerative repeating unit 370. On the other hand, when an optical signal separated by the main-signal separator 313 is not to be regeneratively repeated, the 2×2 optical switch 321 is set in the bar state. In this state, the optical signal separated by the main-signal separator 313 is outputted from the 2×2 optical switch 321 to the postamplifier unit 330. In addition, an optical signal sent from the regenerative repeating unit 370 to the 2×2 optical switch 321 is outputted from the 2×2 optical switch 321 to the postamplifier unit 330. The other switch units 320a, . . . have a similar construction to the switch unit 320.

The postamplifier unit 330 has functions and an internal construction which are similar to the postamplifier unit 130 illustrated in FIG. 3. That is, the postamplifier unit 330 comprises photodetectors (photodiodes) 331, 331a, . . . (respectively provided for the plurality of wavelengths), a main-signal combiner 332, a postamplifier 333, and an OSC-signal combiner 334.

The input levels of the optical signals inputted from the switch units 320, 320a, . . . into the postamplifier unit 330 are detected by the photodetectors 331, 331a, . . . , and information on the detected input levels is supplied to the output-monitor circuit 301. The output-monitor circuit 301 monitors the input levels of the optical signals at the plurality of wavelengths detected by the photodetectors 331, 331a . . . . When the input level of one of the optical signals falls below a predetermined level, the output-monitor circuit 301 sends to the OSC unit 382 WCF information which indicates the channel number of the optical signal.

In addition, the main-signal combiner 332 combines the optical signals which enter the postamplifier unit 330, and outputs the combined optical signals to the postamplifier 333. The postamplifier 333 amplifies the combined optical signals, and outputs the amplified, combined optical signals (as a main signal) to the OSC-signal combiner 334. The OSC-signal combiner 334 combines OSC signals received from the OSC unit 382, with the main signal received from the postamplifier 333, and outputs the optical signal in which the OSC signals are combined with the main signal, to the downstream node (the receiver station 200 in the example of FIG. 2).

Next, the construction for optical amplification in the protection route 22 is explained below.

Each WDM signal transmitted from the adjacent node in the protection route 22 (i.e., the receiver station 200 in the example of FIG. 2) enters the preamplifier unit 340. The preamplifier unit 340 has functions and an internal construction which are similar to the preamplifier unit 140 illustrated in FIG. 3. That is, the preamplifier unit 340 comprises an OSC-signal separator 341, a preamplifier 342, and a main-signal separator 343. In the preamplifier unit 340, the WDM signal is amplified, and separated into optical signals at the plurality of wavelengths. Thereafter, the optical signals at the plurality of wavelengths are sent to the switch units 350, 350a, . . . , respectively. In addition, OSC signals contained in the WDM signal are separated from the other portions (constituting the main signal) of the WDM signal, and supplied to the OSC unit 382.

The switch unit 350 includes a 2×2 optical switch 351, which receives an optical signal at a predetermined wavelength separated by the main-signal separator 343. The optical signal which enters the 2×2 optical switch 351 is outputted to the postamplifier unit 360. Since, in the example of FIG. 5, regenerative repeating of optical signals in the protection route 22 at the wavelength corresponding to the switch unit 350 is unnecessary, the switch unit 350 is not connected to the regenerative repeating unit 370. If the regenerative repeating of optical signals in the protection route 22 at the wavelength corresponding to the switch unit 350 is necessary, the switch unit 350 is also connected to the regenerative repeating unit 370 as the switch unit 320 for the working route 21. Each of the other switch units 350a, . . . have a similar construction to the switch unit 350.

The postamplifier unit 360 has functions and an internal construction which are similar to the postamplifier unit 160 illustrated in FIG. 3. That is, the postamplifier unit 360 comprises photodetectors (photodiodes) 361, 361a, . . . (respectively provided for the plurality of wavelengths), a main-signal combiner 362, a postamplifier 363, and an OSC-signal combiner 364.

The input levels of the optical signals inputted from the switch units 350, 350a, . . . are detected by the photodetectors 361, 361a, . . . , and information on the detected input levels are supplied to the output-monitor circuit 302. The output-monitor circuit 302 monitors the input levels of the optical signals at the plurality of wavelengths detected by the photodetectors 361, 361a, . . . . When the input level of one of the optical signals falls below a predetermined level, the output-monitor circuit 302 sends to the OSC unit 381. WCF (wavelength channel failure) information which indicates the channel number of the optical signal.

In addition, the main-signal combiner 362 combines the optical signals which enter the postamplifier unit 360 and constitute a main signal, and the postamplifier 363 amplifies the combined optical signals, and outputs the amplified, combined optical signals (as the main signal) to the OSC-signal combiner 364. The OSC-signal combiner 364 combines OSC signals received from the OSC unit 381, with the main signal received from the postamplifier 363, and outputs the optical signal in which the OSC signals are combined with the main signal, to the downstream node in the protection route 22 (the repeater station 12 in the example of FIG. 2).

The regenerative repeating units 370, 370a, . . . are respectively provided for the plurality of wavelengths, and regeneratively repeat optical signals. For example, when the regenerative repeating unit 370 receives an optical signal from a client network, the regenerative repeating unit 370 converts the optical signal into an electric signal, monitors the optical signal (when necessary), converts the electric signal, into an optical signal, and outputs the optical signal converted from the electric signal, to the switch unit 320 for the working route 21 or the switch unit 350 for the protection route 22. In addition, the regenerative repeating unit 370 selects one of optical signals sent from at least one of the switch unit 320 for the working route 21 and the switch unit 350 for the protection route 22, and transmits the selected optical signal to another network or the like. Details of the internal construction of the regenerative repeating unit 370 are explained later.

The OSC units 381 and 382 transmit and receive control information to and from the adjacent nodes by using OSC signals at a wavelength different from the plurality of wavelengths of the main signal. The control information is information indicating the states between stations, the states of devices in the entire optical network, information for setting lines or optical signals for use, and other information.

The OSC unit 381 exchanges control information with another OSC unit in the adjacent node on the upstream side in the working route 21 (the repeater station 12 in the example of FIG. 2). Specifically, the OSC unit 381 comprises an optical receiver (OR) 381a and an optical transmitter (OS) 381b. The optical receiver (OR) 381a receives OSC signals transmitted from the repeater station 12 through the OSC-signal separator 311, and the optical transmitter (OS) 381b transmits OSC signals to the repeater station 12 through the OSC-signal combiner 364. In addition, when the OSC unit 381 receives from the output-monitor circuit 302 WCF information on the channel in which lowering of the output power or the like occurs, the OSC unit 381 sends to the OSC-signal combiner 364 an OSC signal including the WCF information.

Similarly, the OSC unit 382 exchanges control information with another OSC unit which is arranged opposite to the OSC unit 382 in the adjacent node on the downstream side in the working route 21 (the receiver station 200 in the example of FIG. 2). Specifically, the OSC unit 382 comprises an optical receiver (OR) 382a and an optical transmitter (OS) 382b. The optical receiver (OR) 382a receives OSC signals transmitted from the receiver station 200 through the OSC-signal separator 341, and the optical transmitter (OS) 382b transmits OSC signals to the receiver station 200 through the OSC-signal combiner 334. In addition, when the OSC unit 382 receives from the regenerative repeating unit 370 or the output-monitor circuit 301 WCF information on the channel in which lowering of the output power or the like occurs, the OSC unit 382 sends to the OSC-signal combiner 334 an OSC signal including the WCF information.

The controller (MC) 390 controls the entire regenerator station 300, and can be realized, for example, by making a computer containing a processor, a memory, and the like execute a program for controlling and monitoring the regenerator station 300. Although not shown in FIG. 5, the controller 390 is electrically connected to the other elements indicated in FIG. 5 through connection lines so that the controller 390 can control the operation of each element.

Figure 6:
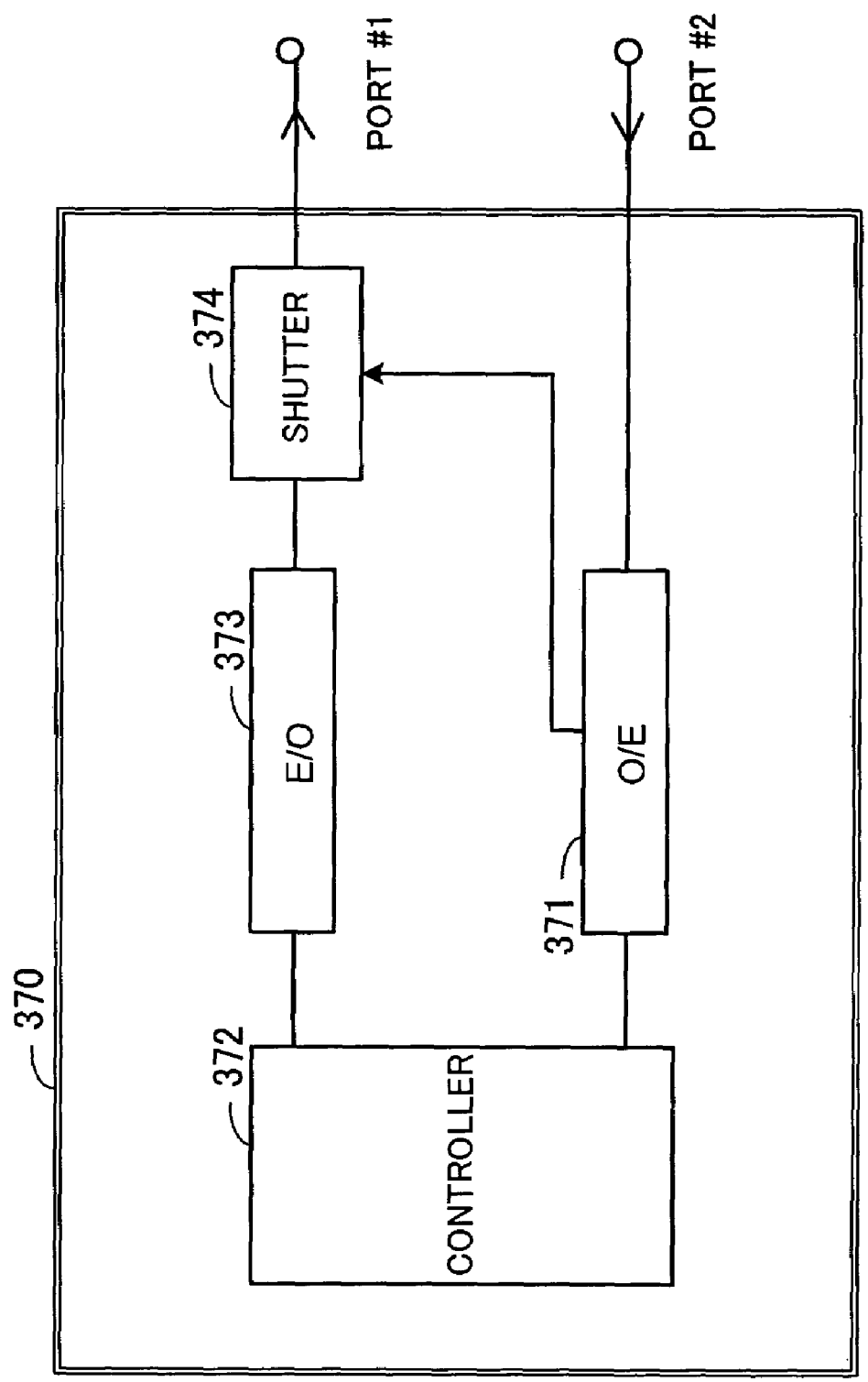
FIG. 6 is a diagram illustrating an example of an internal construction of a regenerative repeating unit.

FIG. 6 is a diagram illustrating an example of an internal construction of the regenerative repeating unit. The regenerative repeating unit 370 illustrated in FIG. 6 comprises an opto-electric converter (O/E) 371, a controller 372, an electro-optic converter (E/O) 373, and a shutter 374. The regenerative repeating unit 370 has a function of a shutter for realizing instantaneous interruption of optical output of an optical transmitter by use of the loss of optical input (RIN) in an optical receiver.

Each optical signal outputted from the switch unit 320 first enters the opto-electric converter 371. The opto-electric converter 371 has a function of a receiver, converts the optical signal inputted thereto, into an electric signal, and detects the input level of the optical signal. When the input level of the optical signal which is detected by the photo-detector 331 falls below a predetermined threshold, the output-monitor circuit 301 detects loss of optical input (RIN), and outputs to the shutter 374 a signal indicating the loss of optical input. At the same time, the opto-electric converter 371 sends WCF information to the OSC unit 382, which exchanges information with a downstream node in the working route 21. The WCF information is alarm information indicating occurrence of a failure in a signal at a wavelength in use Further, the opto-electric converter 371 sends the above electric signal to the controller 372.

The controller 372 reproduces original information on the basis of the above electric signal, and sends to the electro-optic converter 373 a clear electric signal based on the original information. The electro-optic converter 373 converts the clear electric signal sent from the controller 372, into an optical signal, and sends the optical signal converted from the clear electric signal, to the switch unit 320 through the shutter 374.

The shutter 374 lets through or stops the optical signal outputted from the electro-optic converter 373. Specifically, the shutter 374 lets through the optical signal outputted from the electro-optic converter 373 during normal operation. When the shutter 374 receives from the opto-electric converter 371 a signal indicating detection of loss of optical input (RIN), the shutter 374 stops the optical signal outputted from the electro-optic converter 373. When the optical signal is stopped, the regenerative repeating unit 370 stops outputting the optical signal.

In the regenerator station having the above construction, optical signals transmitted through the optical network are regeneratively repeated. For example, when an optical signal transmitted through the working route 21 enters the regenerator station 300, the optical signal enters the preamplifier unit 310. In the preamplifier unit 310, OSC signals are separated from the main signal in the optical signal by the OSC-signal separator 311, and supplied to the OSC unit 381. On the other hand, the main signal is amplified by the preamplifier 312, and separated into optical signals at the plurality of wavelengths by the main-signal separator. 313. The optical signals at the plurality of wavelengths enter the switch units 320, 320a, . . . .

For example, when an optical signal which enters the switch unit 320 is to be regeneratively repeated, the optical signal is lead by the 2×2 optical switch 321 to the regenerative repeating unit 370. When the optical signal enters the regenerative repeating unit 370, the optical signal is converted by the opto-electric converter 371 into an electric signal. In addition, the input level of the optical signal is detected. When the input level of the optical signal to be regeneratively repeated falls below a predetermined threshold, the loss of optical input (RIN) is detected. In this case, a signal indicating the loss of optical input is outputted to the shutter 374, so that the output of the regenerative repeating unit 370 is immediately stopped.

In addition, the electric signal generated by the opto-electric converter 371 are sent to the controller 372, which reproduces a clear electric signal on the basis of the electric signal sent from the opto-electric converter 371. The electric signal reproduced by the controller 372 enters the electro-optic converter 373, which converts the electric signal into an optical signal. When loss of optical input is not detected, the optical signal generated by the electro-optic converter 373 passes through the shutter 374, and is sent to the switch unit 320.

As explained above, when the alarm of loss of optical input (RIN) on the receiver side is used, the optical output from the transmitter can be immediately stopped.

Operations Under Failure

Hereinbelow, operations performed in the optical network when a failure occurs in a portion of the optical network are explained in detail.

Figure 7:
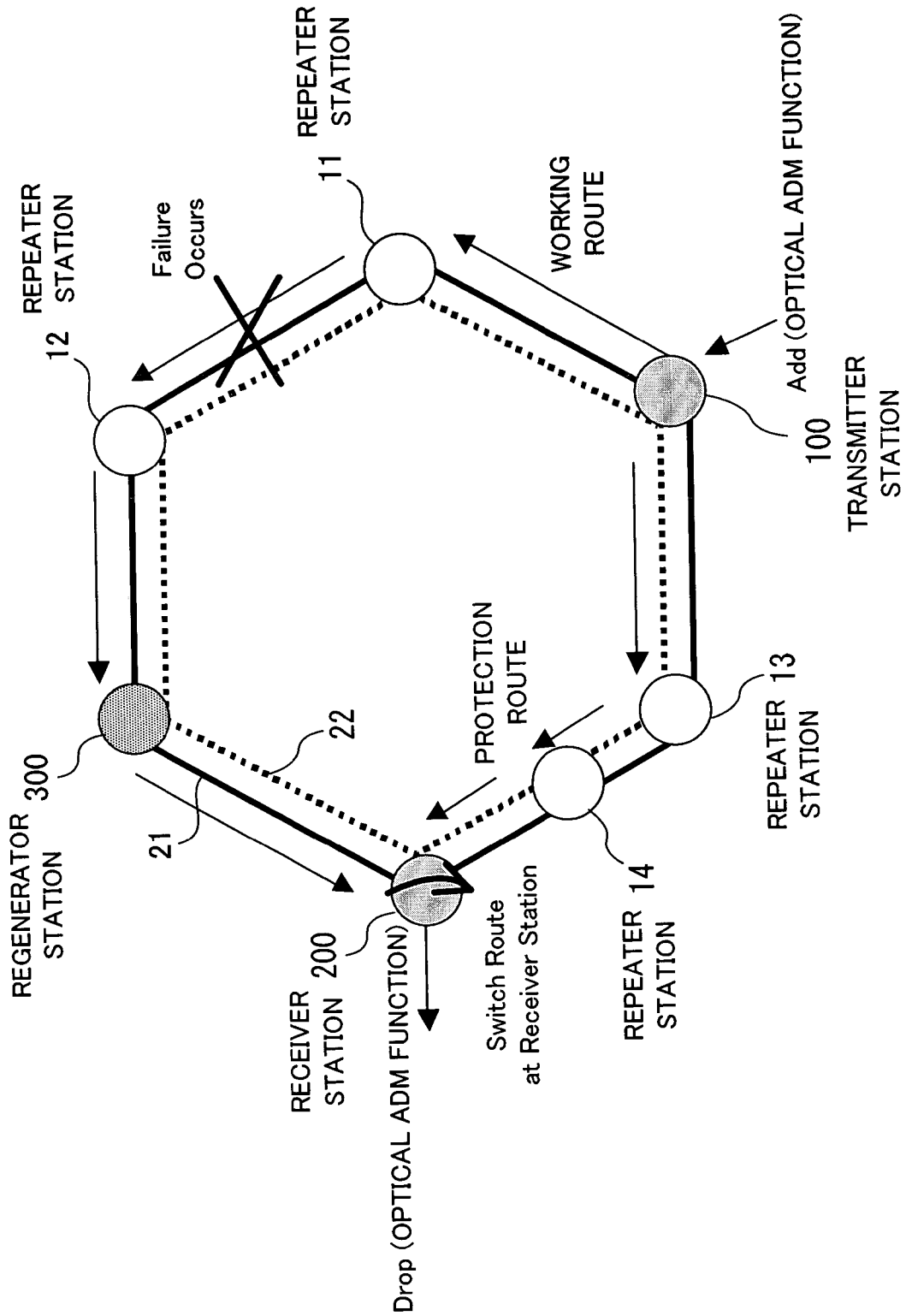
FIG. 7 is a diagram illustrating an example of a situation in an optical network in which a failure occurs.

FIG. 7 is a diagram illustrating an example of a situation in an optical network in which a failure occurs. In the example of FIG. 7, a failure occurs between the repeater stations 11 and 12. In this case, the optical signal from the transmitter station 100 stop before the regenerator station 300. When the regenerator station 300 detects loss of the optical signal, the regenerator station 300 stops the optical output toward the receiver station 200, and transmits WCF information to the receiver station 200. Then, the receiver station 200 switches the transmission route from the working route 21 to the protection route 22.

Figure 8:
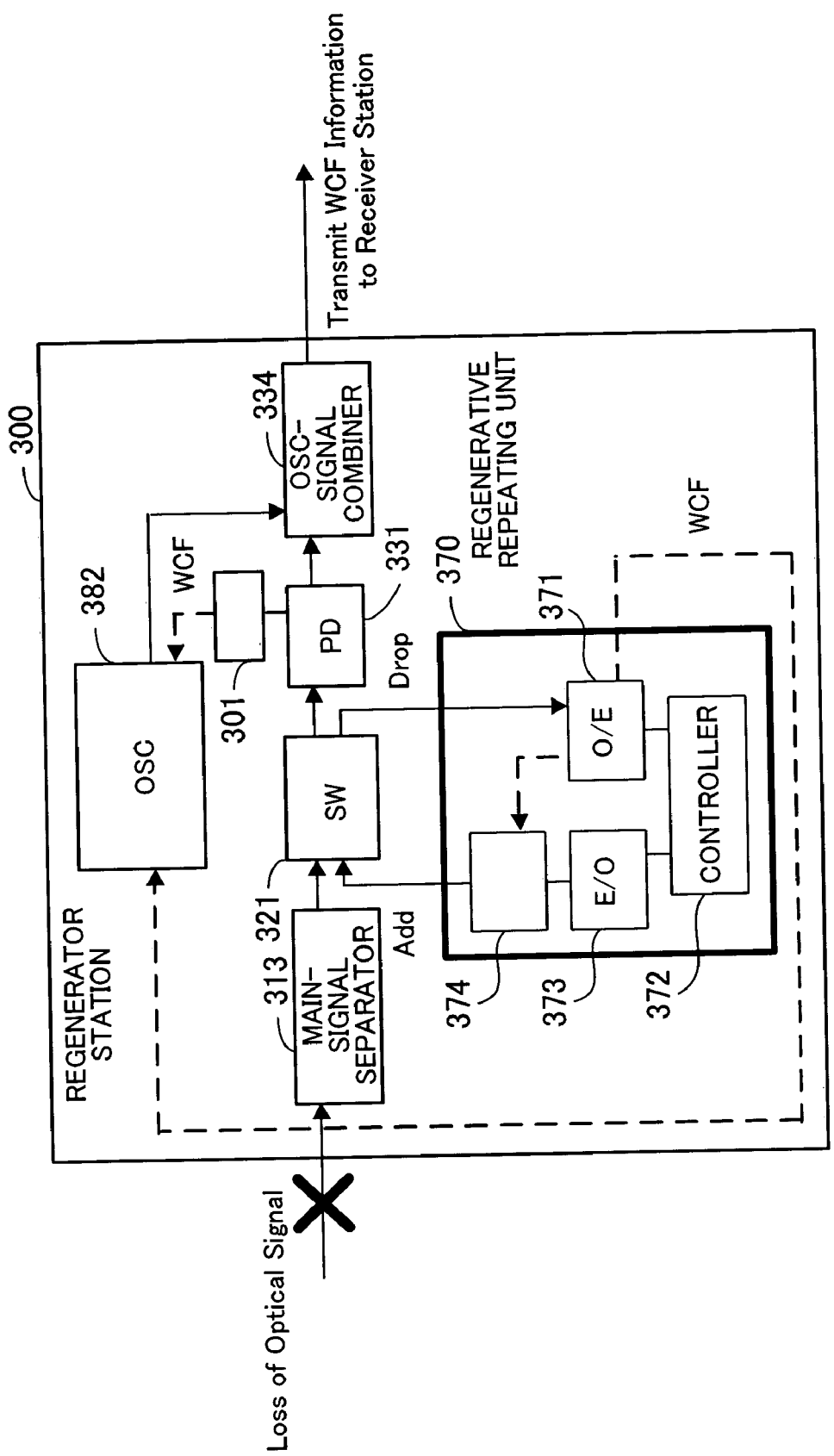
FIG. 8 is a diagram illustrating operations performed by a regenerator station when loss of an-optical signal occurs.

FIG. 8 is a diagram illustrating operations performed by the regenerator station when loss of an optical signal occurs. In FIG. 8, only the elements which are necessary for explanations of the operations performed when loss of an optical signal occurs are indicated.

When the input level of an optical signal (in a WDM signal) having a wavelength which is to be regeneratively repeated by the regenerator station 300 is so low that the regenerator station 300 determines that loss of an optical signal occurs, the input level of an optical signal which is separated by the main-signal separator 313 and lead to the regenerative repeating unit 370 by the 2×2 optical switch 321 also becomes low. When such a weak optical signal enters the regenerative repeating unit 370, the opto-electric converter 371 detects loss of optical input (RIN). At this time, the regenerative repeating unit 370 sends WCF information to the OSC unit 382, and a signal indicating the loss of optical input to the shutter 374. Then, the shutter 374 stops output of the optical signal.

When the output of an optical signal from the regenerative repeating unit 370 is stopped, no light is detected by a photodetector (PD) 331 corresponding to the wavelength of the optical signal, so that the output-monitor circuit 301 determines that loss of a main signal in the corresponding channel occurs, and sends to the OSC unit 382 WCF information on the channel. The OSC unit 382 sends to the OSC-signal combiner 334 an optical signal containing WCF information. Then, an optical signal containing the WCF information is transmitted to the downstream node in the working route 21 (i.e., the receiver station 200).

In the receiver station 200, one or both of LOL detection in the receiver station 200 and acquisition of WCF information which is transmitted through the OSC (optical supervisory channel) trigger optical protection, so that the selection in the optical switch for switching the input into the transponder is changed, and optical signals transmitted through the protection route 22 are sent to clients.

Variations of Regenerative Repeating Unit

The regenerative repeating unit may have the following constructions, instead of the construction of FIG. 6.

Figure 9:
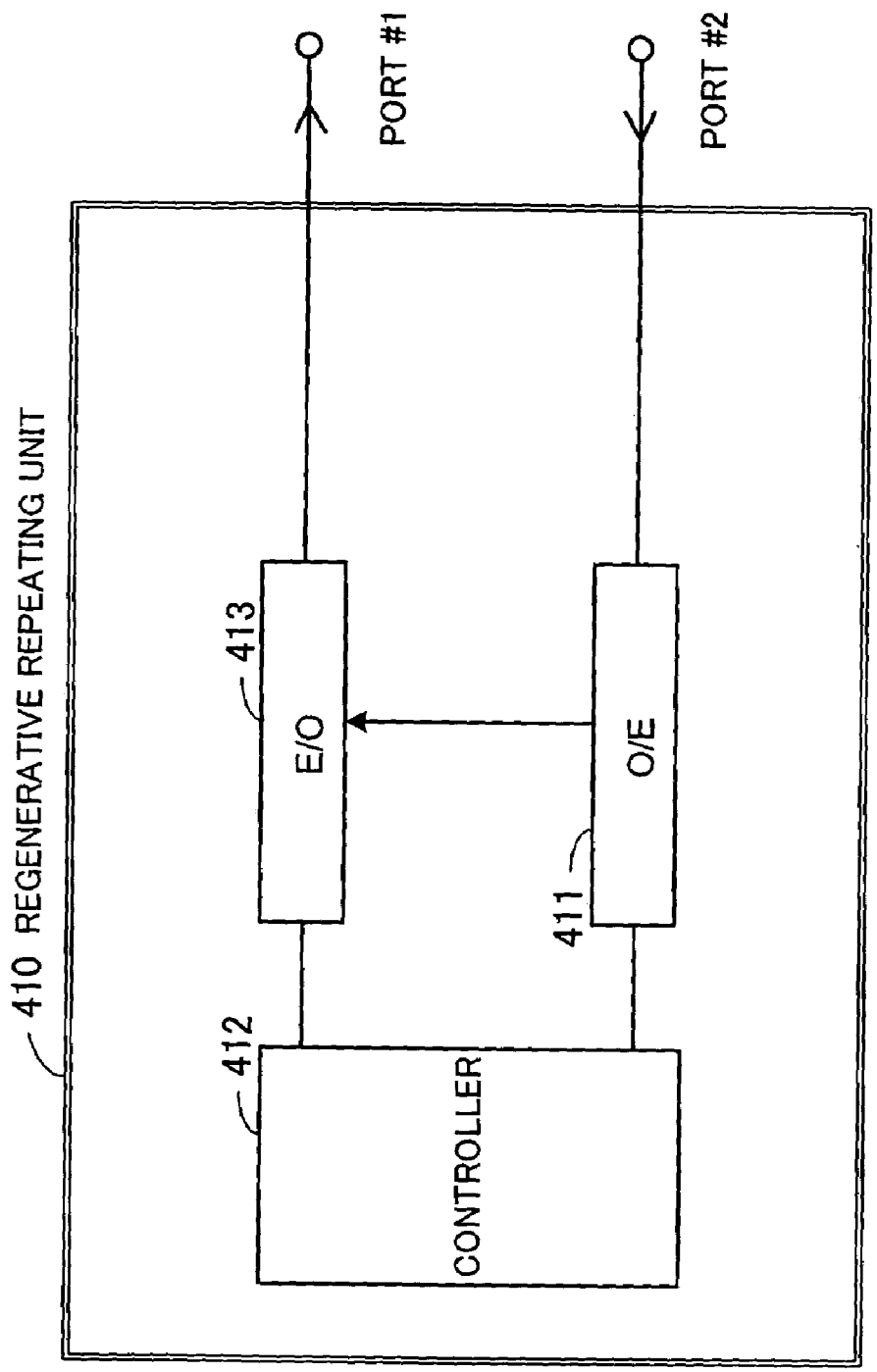
FIG. 9 is a diagram illustrating a first variation of the regenerative repeating unit.

FIG. 9 is a diagram illustrating a first variation of the regenerative repeating unit. The regenerative repeating unit 410 illustrated in FIG. 9 comprises an opto-electric converter (O/E) 411, a controller 412, and an electro-optic converter (E/O) 413. Hereinbelow, the functions of the regenerative repeating unit 410 are explained, where it is assumed that the regenerative repeating unit 370 in the construction of FIG. 5 is replaced with the regenerative repeating unit 410.

Each optical signal outputted from the switch unit 320 first enters the opto-electric converter 411. The opto-electric converter 411 has a function of a receiver, converts the optical signal which enters the regenerative repeating unit 410, into an electric signal, and detects the input level of the optical signal. When the input level of the optical signal falls below a predetermined threshold, loss of optical input (RIN) is detected, and a signal indicating the loss of optical input is outputted to the electro-optic converter 413. At the same time, the opto-electric converter 411 sends WCF information to the OSC unit 382, which exchanges information with the downstream node in the working route 21. Further, the opto-electric converter 411 sends to the controller 412 the above electric signal generated by the opto-electric converter 411.

The controller 412 reproduces original information on the basis of the above electric signal, and sends to the electro-optic converter 413 a clear electric signal based on the original information. When the electro-optic converter 413 does not receive the signal indicating the loss of optical input, the electro-optic converter 413 converts the electric signal sent from the controller 412, into an optical signal, and sends the optical signal converted from the clear electric signal, to the switch unit 320. When the electro-optic converter 413 receives the signal indicating the loss of optical input, the electro-optic converter 413 stops its output.

Since the regenerative repeating unit 410 has the above functions, when the regenerative repeating unit 410 detects loss of optical input, the regenerative repeating unit 410 can quickly stop its optical output.

Figure 10:
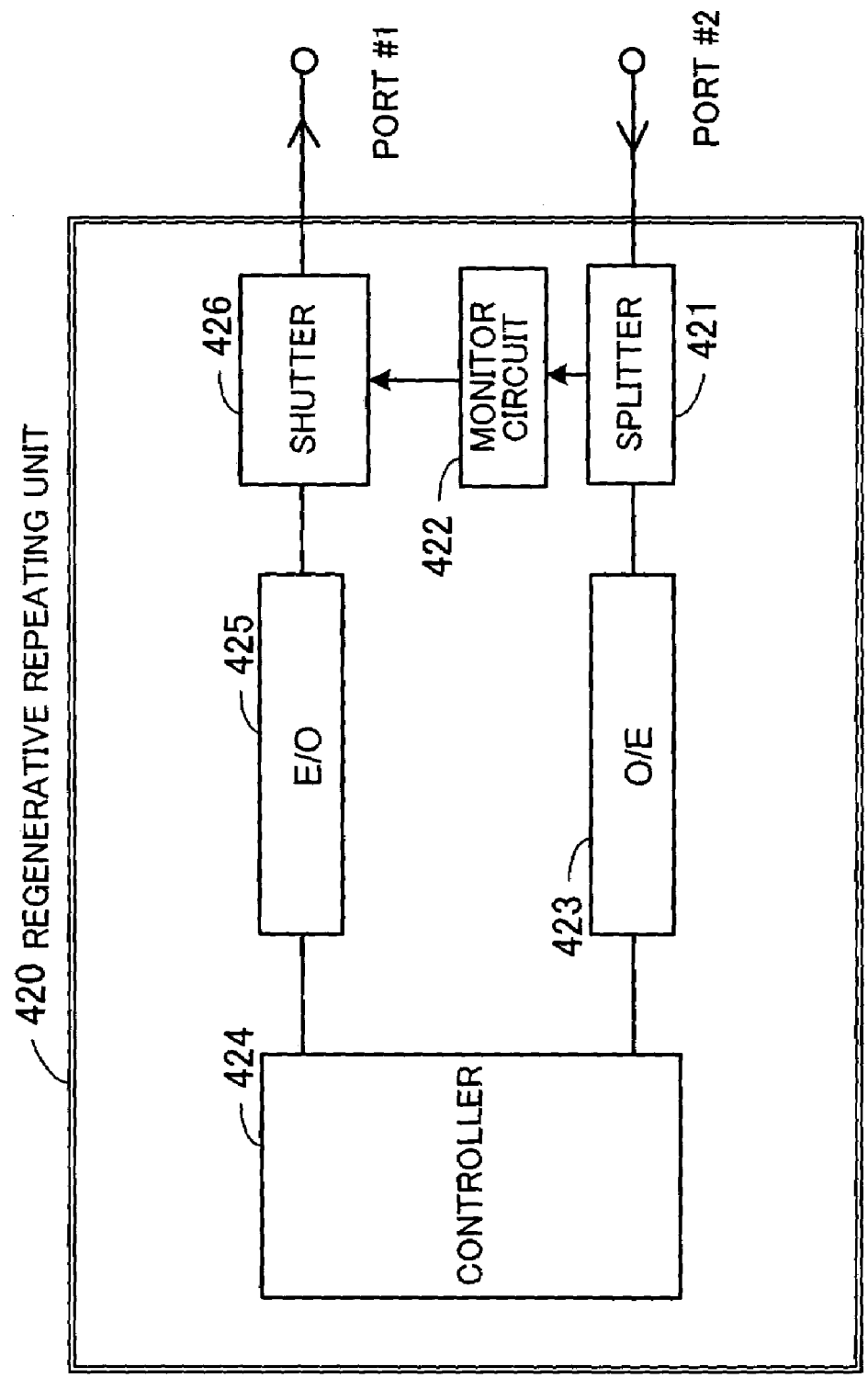
FIG. 10 is a diagram illustrating a second variation of the regenerative repeating unit.

FIG. 10 is a diagram illustrating a second variation of the regenerative repeating unit. The regenerative repeating unit 420 illustrated in FIG. 10 comprises a splitter 421, a monitor circuit 422, an opto-electric converter (O/E) 423, a controller 424, an electro-optic converter (E/O) 425, and a shutter 426. Hereinbelow, the functions of the regenerative repeating unit 420 are explained, where it is assumed that the regenerative repeating unit 370 in the construction of FIG. 5 is replaced with the regenerative repeating unit 420.

Each optical signal outputted from the switch unit 320 first enters the opto-electric converter 423 through the splitter 421. The splitter 421 splits the optical signal, and sends a portion of the optical signal to the monitor circuit 422. The monitor circuit 422 monitors the input level of the portion of the optical signal. When the input level of the optical signal falls below a predetermined threshold, the monitor circuit 422 detects loss of optical input (RIN), and sends to the shutter 426 a signal indicating the loss of optical input. At the same time, the monitor circuit 422 sends WCF information to the OSC unit 382, which exchanges information with a downstream node in the working route 21.

The opto-electric converter 423 converts the optical signal which enters the regenerative repeating unit 420, into an electric signal, and sends the generated electric signal to the controller 424. The controller 424 reproduces original information on the basis of the above electric signal, and sends to the electro-optic converter 425 a clear electric signal based on the original information. The electro-optic converter 425 converts the electric signal sent from the controller 424, into an optical signal, and sends the optical signal converted from the clear electric signal, to the switch unit 320 through the shutter 426.

The shutter 426 lets through or stops the optical signal outputted from the electro-optic converter 425. Specifically, the shutter 426 lets through the optical signal outputted from the electro-optic converter 425 during normal operation. When the shutter 426 receives from the monitor circuit 422 a signal indicating detection of loss of optical input (RIN), the shutter 426 stops the optical signal outputted from the electro-optic converter 425. When the optical signal is stopped, the regenerative repeating unit 420 stops outputting the optical signal.

Figure 11:
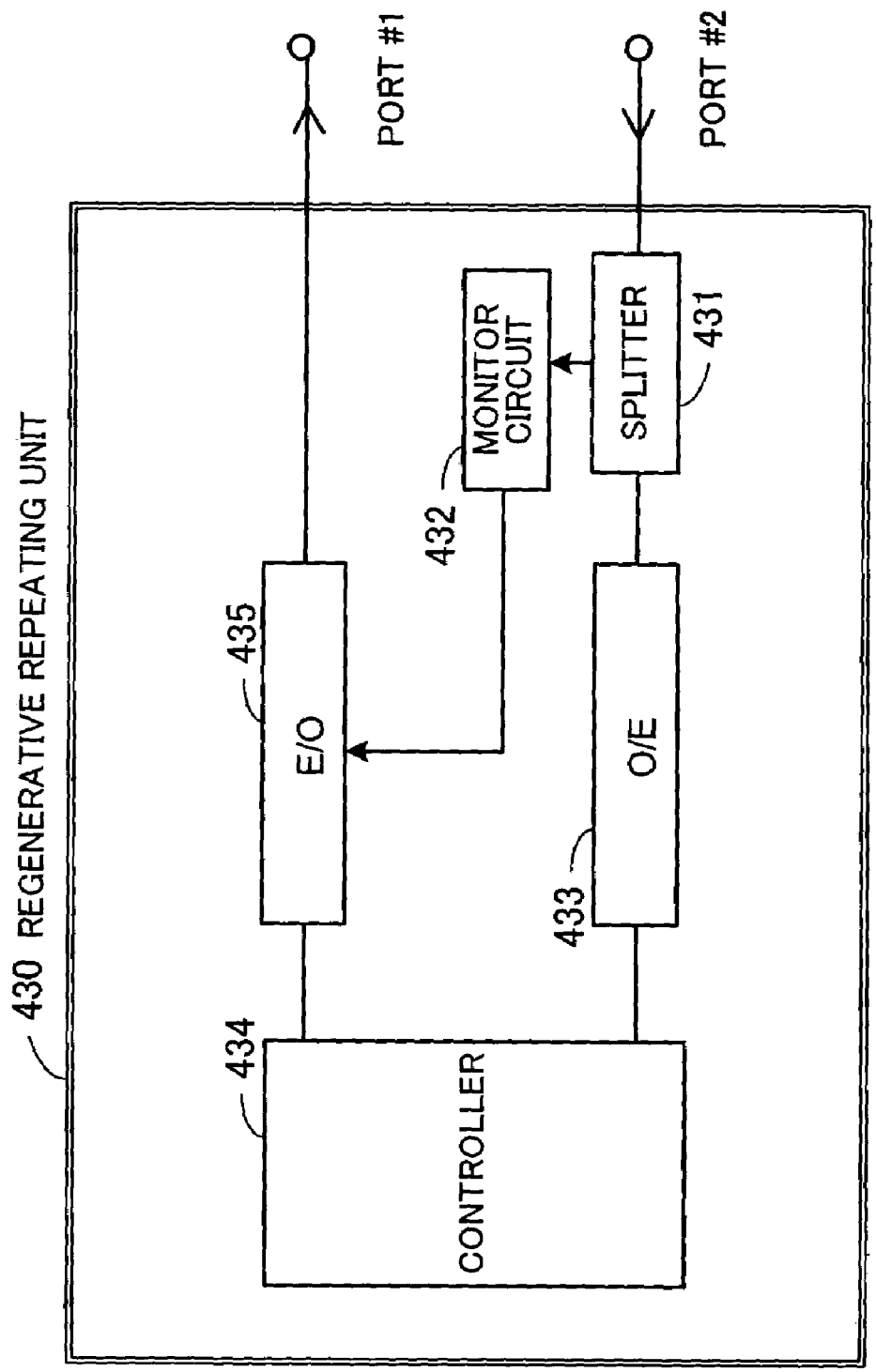
FIG. 11 is a diagram illustrating a third variation of the regenerative repeating unit.

FIG. 11 is a diagram illustrating a third variation of the regenerative repeating unit. The regenerative repeating unit 430 illustrated in FIG. 11 comprises a splitter 431, a monitor circuit 432, an opto-electric converter (O/E) 433, a controller 434, and an electro-optic converter (E/O) 435. Hereinbelow, the functions of the regenerative repeating unit 430 are explained, where it is assumed that the regenerative repeating unit 370 in the construction of FIG. 5 is replaced with the regenerative repeating unit 430.

Each optical signal outputted from the switch unit 320 first enters the opto-electric converter 433 through the splitter 431. The splitter 431 splits the optical signal, and sends a portion of the optical signal to the monitor circuit 432. The monitor circuit 432 contains a photodetector (PD), and monitors the input level of the portion of the optical signal. When the input level of the optical signal falls below a predetermined threshold, the monitor circuit 432 detects loss of light (LOL), and sends to the electro-optic converter 435 a signal indicating the loss of light. At the same time, the monitor circuit 432 sends WCF information to the OSC unit 382, which exchanges information with a downstream node in the working route 21.

The opto-electric converter 433 converts the other portion of the optical signal outputted from the splitter 431, into an electric signal, and sends the generated electric signal to the controller 434. The controller 434 reproduces original information on the basis of the above electric signal, and sends to the electro-optic converter 435 a clear electric signal based on the original information. When the electro-optic converter 435 does not receive the signal indicating the loss of optical input, the electro-optic converter 435 converts the electric signal sent from the controller 434, into an optical signal, and sends the optical signal converted from the clear electric signal, to the switch unit 320. When the electro-optic converter 435 receives the signal indicating the loss of optical input, the electro-optic converter 435 stops its output.

Advantages

According to the embodiment of the present invention, the transmission route is switched to the protection route 22 in the optical network by using the 1×2 optical switch in the receiver station 200, and one or both of LOL detection by a photodetector and acquisition of WCF information which is transmitted through the OSC (optical supervisory channel) trigger the switching. In addition, loss of a main signal detected by the regenerative repeating unit triggers stopping of output of an optical signal from the regenerative repeating unit. Therefore, the receiver station can detect LOL, which indicates loss of an optical signal and triggers switching of the optical transmission line.

In addition, the regenerator station 300 transmits WCF information to the receiver station 200, and the receiver station 200 switches the transmission route to the protection route 22 in response to the reception of the WCF information. Therefore, even when noise is accumulated by optical amplifiers arranged in multiple stages in the optical network, it is possible to realize reliable optical network protection.

Variations (i) Although the present invention is applied to an optical ring network in the above embodiment, the present invention can also be applied to linear networks.

(ii) Although, in the above embodiment, the WCF information is transmitted in the counterclockwise direction, (i.e., in the downstream direction in the working route 21), the WCF information may be transmitted in the clockwise direction (i.e., in the upstream direction in the working route 21). Further, the WCF information may be transmitted in both of the counterclockwise and clockwise directions.

(iii) It is possible to configure the regenerative repeating unit 370 so that the regenerative repeating unit 370 can detect the B2-byte error rate in SONET (Synchronous Optical Network) or SDE (Synchronous Digital Hierarchy), and transfer WCF information to an OSC unit when the B2-byte error rate exceeds a threshold which is preset.

(iv) In order to make the detection of the RIN or LOL reliable, It is possible to configure the receiver station or the regenerator station so that the thresholds for detection of the LOL in the photodetectors can be variably set from outside. For example, the receiver station 200 may be configured so that the thresholds for detection of the RIN or LOL in the photodetectors can be externally set to an arbitrary level (for example, from a terminal which is arranged for remote monitoring and control and connected to the receiver station 200 through a network, or the like). Similarly, in the case where a photodetector is arranged in a stage preceding the optical receiver in each regenerative repeating unit for generating the WCF information in response to detection of the LOL by the photodetector, the regenerator station 300 may be configured so that the threshold for the detection of the LOL can be externally set to an arbitrary level (for example, by a terminal which is arranged for remote monitoring and control and connected to the receiver station 200 through a network, or the like).

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method for switching a transmission route for use in transmission from a transmission station to a receiver station in an optical network in which the transmission station and the receiver station are connected through a plurality of transmission routes with redundancy, comprising the steps of:

(a) in a switch unit of a regenerator station disposed between the transmission station and the receiver station, extracting a main signal having a predetermined wavelength from a first one of the plurality of transmission routes, receiving a first optical signal, and inserting the first optical signal into the predetermined one of the plurality of transmission routes;

(b) converting the main signal extracted from the predetermined one of the plurality of transmission routes into an electric signal, and detecting an input level of the main signal, in the regenerator station;

(c) in a transmitter of the regenerator station, converting the electric signal into a second optical signal, inputting the second optical signal into the switch unit of the regenerator station as the first optical signal when the input level is equal to or higher than a predetermined level, and stopping output of the second optical signal when the input level is lower than the predetermined level;

(d) transmitting a control signal indicating occurrence of a failure, from the regenerator station through a transmission route to the receiver station, when the input level is lower than the predetermined level; and (e) in the receiver station, switching a transmission route from which the receiver station acquires the main signal, from the first one of the plurality of transmission routes to a second one of the plurality of transmission routes, when an input level of the main signal at the receiver station is lower than a predetermined level or when the receiver station receives the control signal.

2. The method according to claim 1, wherein in step (c), the output of the second optical signal converted from the electric signal is stopped by closing a shutter arranged in a path of the optical signal in the regenerator station.

3. The method according to claim 1, wherein in step (c), the output of the second optical signal is stopped by stopping the conversion from the electric signal to the second optical signal.

4. An optical transmission device having functions of a regenerator station on an optical network constituted by a plurality of transmission routes with redundancy, comprising:
   a switch unit which extracts a main signal having a predetermined wavelength from a predetermined one of the plurality of transmission routes, receives a first optical signal, and inserts the first optical signal into the predetermined one of the plurality of transmission routes;
   a receiver which converts the main signal extracted from the predetermined one of the plurality of transmission routes, into an electric signal, and detects an input level of the main signal;
   a transmitter which converts the electric signal into a second optical signal, inputs the second optical signal into the switch unit as the first optical signal when the input level is equal to or higher than a predetermined level, and stops output of the second optical signal when the input level is lower than the predetermined level; and
   an optical monitor unit which sends a control signal indicating occurrence of a failure through a transmission route to a receiver station as a destination of the main signal when the input level is lower than the predetermined level.

5. The optical transmission device according to claim 4, wherein the receiver comprises an opto-electric converter which converts an optical signal into an electric signal and can detect loss of optical input, and when the opto-electric converter detects the loss of optical input, the transmitter determines that the input level is lower than the predetermined level.

6. The optical transmission device according to claim 4, wherein the receiver comprises,
   an opto-electric converter which converts an optical signal into an electric signal,
   a splitter which splits the main signal into a first portion supplied to the opto-electric converter and a second portion supplied to a photodetector, and
   the photodetector, which detects the input level on the basis of the second portion of the main signal.

7. The optical transmission device according to claim 4, wherein the transmitter comprises a shutter arranged in a path through which the second optical signal is to be outputted, and the transmitter stops the output of second optical signal by closing the shutter.

8. The optical transmission device according to claim 4, wherein the transmitter comprises an electro-optic converter which converts an electric signal into an optical signal, and stops the output of the second optical signal by stopping output from the electro-optic converter.

* * * * *